United States Patent

Barra et al.

[11] Patent Number: 5,086,581
[45] Date of Patent: Feb. 11, 1992

[54] ELECTRONIC FISHING BOBBER

[76] Inventors: Charles L. Barra, P.O. Box 196; William M. Neese, 401 School Way, both of Redwood Valley, Calif. 95470

[21] Appl. No.: 642,702

[22] Filed: Jan. 16, 1991

Related U.S. Application Data

[63] Continuation-in-part of Ser. No. 383,824, Jul. 21, 1989, abandoned.

[51] Int. Cl.$^5$ .............................................. A01K 97/00
[52] U.S. Cl. ..................................... 43/26.1; 43/41.2
[58] Field of Search ............... 43/17.5, 26.1, 41, 41.2, 43/44.87, 44.99; 446/153, 154, 160, 163, 164, 165

[56] References Cited

U.S. PATENT DOCUMENTS

| | | |
|---|---|---|
| 3,099,099 | 7/1963 | Cahen et al. |
| 3,618,254 | 11/1971 | Myers |
| 3,710,500 | 1/1973 | Pena |
| 3,758,975 | 9/1973 | Curtis |
| 3,911,609 | 10/1975 | Baya |
| 4,075,777 | 2/1978 | Dalton |
| 4,161,077 | 7/1979 | Ciaccio et al. |
| 4,339,888 | 7/1982 | Sheng-Jung |
| 4,638,585 | 1/1987 | Korte |
| 4,757,633 | 7/1988 | Van Cleve |

Primary Examiner—Kurt Rowan
Attorney, Agent, or Firm—Townsend and Townsend

[57] ABSTRACT

The present invention is directed to a motorized fishing device having a body which encloses an upper portion and a lower portion, the upper portion being watertight and the lower portion having a plurality of sieve-like holes; means for moving the body through the water by jet force, the moving means including a motor within the upper portion of the body and an impeller within the lower portion of the body; means for directing movement of the body in the water; and means for detachably and pivotably mounting the body to a fishing line.

The device can run and turn over the towed line without entanglement because of the ability of the detachment means to revolve. Tension applied to the line either intentionally by the user or by a fish that has struck the hook will release the line from the body. The fouling of the propeller by the fishing line or by weeds in the water is prevented by the placement of the impeller inside the body of the device and by the filtering through a sieve-like filter of all water which reaches the propeller.

This invention further includes a floatable shield which is capable of sliding along the fishing line between the body of the device and a fish hook. The shield slides over and encloses the hook when the device and the fishing line are in motion. This protects the hook from becoming fouled in heavily vegetated water. When the device is stopped, the weighted hook drops to a predetermined depth in the water while the shield remains on the top of the water, acting as a float and a location indicator for the hook.

17 Claims, 3 Drawing Sheets

ELECTRONIC FISHING BOBBER

This application is a continuation of U.S. patent application Ser. No. 07/383,824, filed July 21, 1989, now abandoned.

BACKGROUND OF THE INVENTION

1. Field of the Invention

This invention relates generally to motorized fishing devices which attach to fishing lines to feed the line out in the water to remote or other locations while the user remains on shore or in a boat.

2. Description of the Art

Fishing has been traditionally carried out by using a rod and reel, by means of which the line is cast from the shore or other location proximate the water. The area of fishing in this manner is quite limited, and may be even further impaired by snagging the line in trees or objects in the water. Further limitations are imposed when fishing in remote areas that cannot easily be reached by boat or on foot or in areas where boats are prohibited.

Many previous patents disclose motorized means of towing a fishing line. However, none of these address the problem of fouling the fishing line and hook while it is being towed through vegetated waters, or the problem of tangling the line in the exposed propeller or impeller. Nor do they address the problem of fouling the impeller by vegetation in water, causing the bobber to stall. Further, the previous designs are complex and expensive, and by the lack of their production have proven to be economically unfeasible.

Prior art devices have typically included a body having a motor which drives a propeller. The fishing line is attached either to the motorized body or to a float such as a bobber positioned upstream from and connected with the motorized body. The devices may be self-propelled, as for example those disclosed by Pena, U.S. Pat. No. 3,710,500; Curtis, U.S. Pat. No. 3,758,975; Myers, U.S. Pat. No. 3,618,254; and Baya, U.S. Pat. No. 3,911,609. Other devices are radio-controlled, such as those disclosed by Van Cleve, U.S. Pat. No. 4,757,633 Ciaccio et al., U.S. Pat. No. 4,161,077, and Sheng-Jung, U.S. Pat. No. 4,339,888. In all such devices, however, the propeller is typically exposed in the water, allowing it to become entangled in the fishing line and fouled in weeds, etc. Additionally, the fish hook which is pulled along by the motorized device is also exposed to weeds, underlying branches and such in the water, causing fouling of the hook as well. U.S. Pat. No. 4,638,585 to Korte discloses a motorized fishing device which includes a cage around the propeller to help prevent fouling. U.S. Pat. No. 3,099,099 to Cahen et al. discloses a conventional propeller guard of a type similar to that found in small boats. However, hair-like fibers (weeds, algae, etc.) are still able to enter the cage and wrap around the propeller shaft, freezing the propeller. Additionally, the device is not radio-controlled and is not capable of detaching from the fishing line. It is not stable in the water or floatable by itself and must therefore be attached to a separate float such as a bobber. Also, the fish hook remains exposed to fouling.

The need remains for an electronic fishing bobber which is highly maneuverable in the water, can be used in vegetated areas without fouling the propeller or the fish hook, and may be detached from the fishing line so that a fish on the hook may be played or several lines may be placed at different locations in the water.

SUMMARY OF THE INVENTION

The present invention is directed to an electronic fishing bobber having a generally spherical body which encloses an upper portion and a lower portion, the upper portion being water-tight and the lower portion having a plurality of sieve-like holes for filtering water entering the lower portion, wherein the lower portion includes a rearward jet port and a forward volume for receiving and filtering water through the sieve-like holes, and wherein the lower portion is generally hemispherical and a forward volume is much larger than the rearward jet port so that water can flow from the forward volume to the impeller in the jet port as the body moves forward; means for moving the body through the water by jet force, the moving means including a motor within the upper portion of the body and an impeller recessed within the lower portion of the body; means for directing movement of the body in the water; and means for detachably and pivotably mounting the body to a fishing line.

The device can turn and pass over the towed line without entanglement because of the ability of the detachment means to revolve. Tension applied to the line either intentionally by the user or by a fish that has struck the hook will release the line from the body. The fouling of the impeller by the fishing line or by weeds in the water is prevented by recessing the impeller inside of a jet port in the body of the device and by the filtering through a sieve-like filter of all water which reaches the impeller, the filter being hemispherical in shape providing a much larger forward volume and surface area than the rearward jet port so that water can flow from the forward volume to the impeller in the jet port as the body moves forward.

This invention further includes a floatable shield which is capable of sliding along the fishing line between the body of the device and a fish hook. The shield slides over and encloses the hook when the device and the fishing line are in motion. This protects the hook from becoming fouled in heavily vegetated water. When the device is stopped, the weighted hook drops to a predetermined depth in the water while the shield remains on the top of the water, acting as a float and a location indicator for the hook.

The electronic fishing bobber of this invention can be used to place multiple lines and hooks at different locations by directing the device with line and hook attached to a desired location, disconnecting the line, and returning the device to the user to repeat the operation as many times as desired.

DETAILED DESCRIPTION

Figure 1:
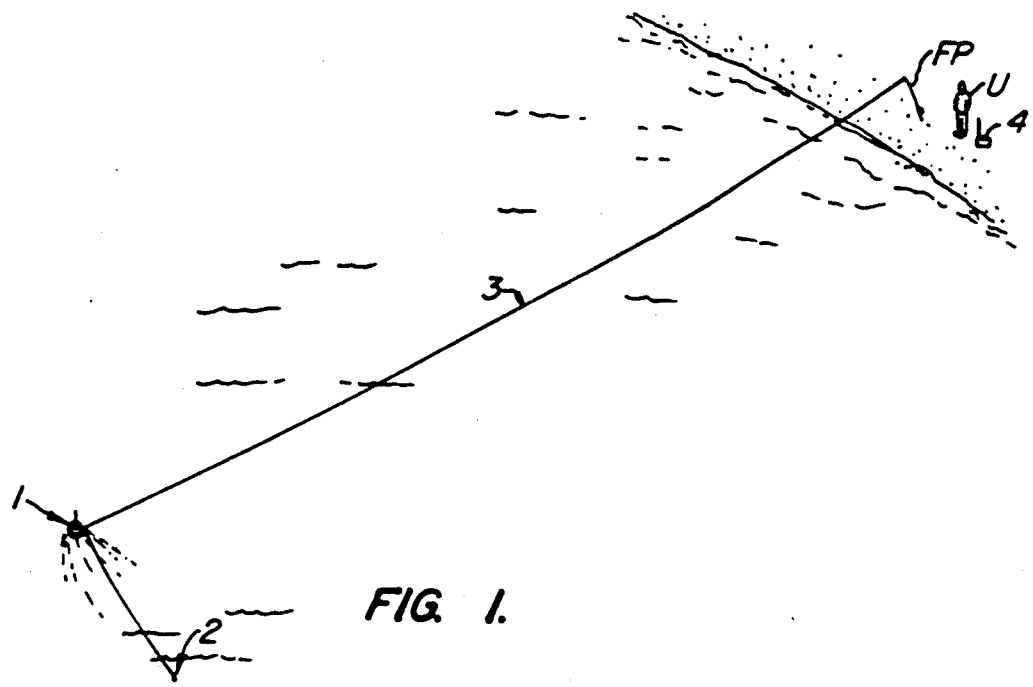
FIG. 1 is an illustrational view showing the operation of the fishing system utilizing the electronic fishing bobber.

Referring now to the drawings in detail, FIG. 1 illustrates a remote radio-controlled fishing device 1 which is towing a fishing line 3 and which is positioned between a fishing pole FP and a floatable shield 2 on the end of the fishing line. The fishing bobber is under the operation and control of a user U operating a remote control transmitter 4.

Figure 2:
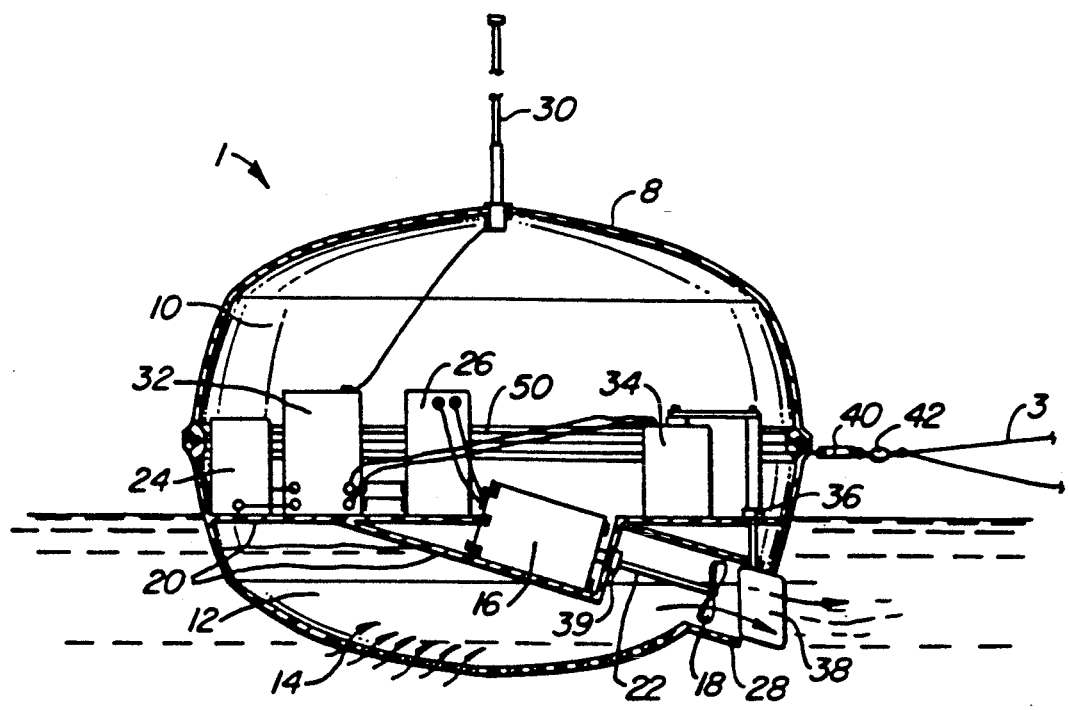
FIG. 2 is a side cross-sectional view of an electronic fishing bobber constituting a preferred embodiment of the present invention showing a generally spherical body enclosing an upper portion and a lower portion of the motorized fishing device, and shown with a portion of a fishing line.
Figure 3:
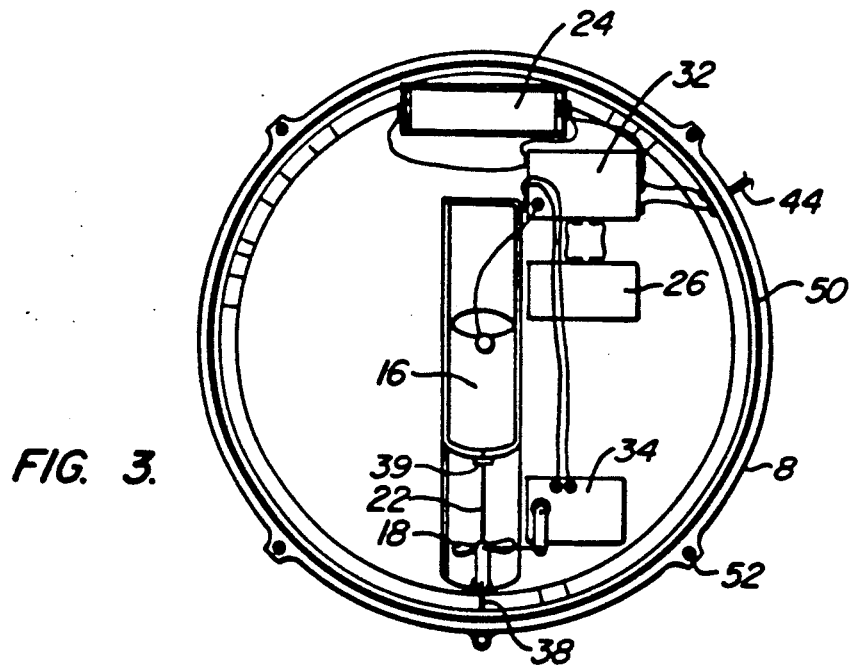
FIG. 3 is a top cross-sectional view of the fishing bobber of FIG. 2.
Figure 4:
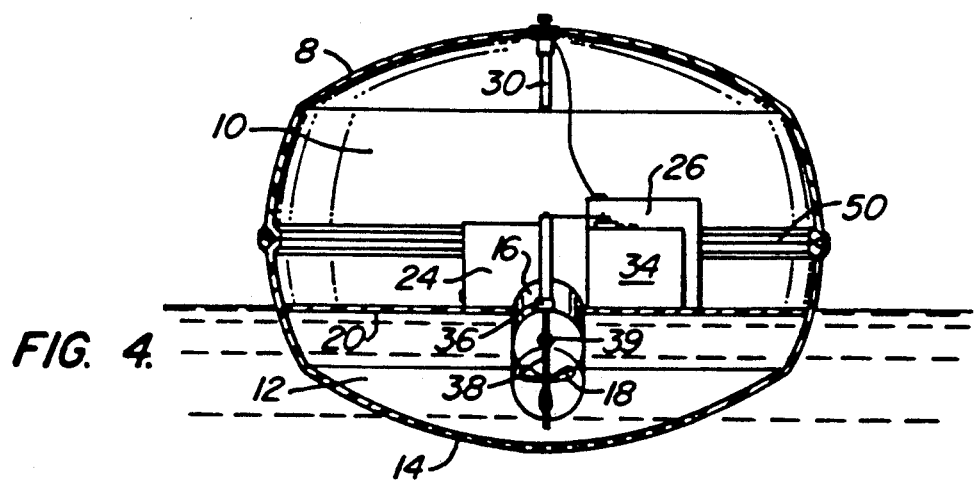
FIG. 4 is a rear cross-sectional view of the fishing bobber of FIG. 2.

There is shown in FIGS. 2 to 4, for illustrative purposes only, a preferred embodiment of the motorized fishing device 1, which includes a body 8 having the generally spherical shape illustrated in the drawings. The body 8 encloses an upper portion 10 and a lower portion 12 separated by a water-impermeable barrier 20. The upper portion 10 is water-tight whereas the lower portion 12 has a plurality of sieve-like holes 14 which filter the water as it enters the lower portion. The holes 14 should be of such a size to allow water to enter the lower portion 12 while at the same time not allowing particles of a size sufficient to cause fouling of an impeller 18. Lower portion 12 is generally hemispherical and has a rearward jet port adapted to surround an impeller, discussed below; the lower portion 12 also has a forward volume for receiving and filtering water through the sieve-like holes. As a result of the spherical shape, the forward volume is much larger than the volume of the jet port 28 so that the sieve-like holes 14 on the forward volume allow water to slowly infiltrate to impeller 18, rather than being drawn through at a rapid volume by the action of impeller 18. Thus, the only water which reaches impeller 18 has been filtered.

The device 1 is provided with means for moving the body 8 through the water by jet force, the means including a motor 16 in upper portion 10 connected through a water-tight seal 39 by a drive shaft 22 to an impeller 18 mounted in a jet port 28 in the rear of lower portion 12. Jet port 28 surrounds the impeller 18 so that the impeller is recessed therein. In the preferred embodiment, the motor 16 is connected to battery 24 through a variable speed control apparatus 26 for changing the speed at which the device moves in the water. However, such variable speed control is not required for the practice of the invention.

The fishing device of the present invention employs an integrated design wherein the generally spherical shape of the body, placement of the sieve-like filtering holes, and placement of the impeller recessed within the protective jet port allows the fishing device to be guided through reeds and heavy weeds without fouling of the impeller or loss of mobility.

In the practice of the invention water is drawn, by the action of the impeller 18, into the lower forward volume of portion 12 of body 8 through the sieve-like holes 14 and out the jet port 28, as illustrated by the arrows in FIG. 2. This creates a jetting-type action to move the body 8 through the water. The holes effectively filter out foreign objects in the water such as weeds, grasses and lilypads so that the impeller does not become fouled, causing the device to stall. In addition, the hemispherical shape of the forward volume provides a large surface area so that even if some sieve-like holes 14 become clogged, other holes can still function to draw in water.

Means for directing movement of the body 8 in the water is achieved in the preferred embodiment by a steering servo motor apparatus 34 in the upper portion 10 of the body, which apparatus acts through an appropriate gearing system as taught in the art and a watertight seal 36 to control a rudder 38 proximate the jet port 28.

Operation of the moving means and the directing means is preferably carried out in a well-known manner by a radio signal from a remote control radio transmitter on shore. Thus, in the preferred embodiment, a radio receiving antenna 30 is connected to a two-channel receiver 32 in upper portion 10 of body 8. The receiver provides a first channel for receiving a propulsion control signal and forwarding the input to the variable speed control apparatus 26. The receiver also provides a second channel for receiving a direction control signal which is forwarded to the steering servo motor apparatus 34 and the rudder 38.

The motor 16, variable speed control apparatus 26, radio receiver 32, and steering servo motor apparatus 34 are all powered by one or more batteries 24 in upper portion 10, which batteries may be replaced or removed for recharging or may be recharged by a solar cell (not shown) which may be placed on the dome surface of the upper portion 10 of the body 8. The entire fishing device may be activated or deactivated by an on/off switch 44 (FIG. 3).

Further in accordance with the present invention, means in the form of a catch or any equivalent means is provided for detachably and pivotably mounting the body 8 to a fishing line 3 to enable the fishing device to carry the line 3 out into the water. In the preferred embodiment of the line detachment means, a rotatable ring-and-swivel member 40 is attached to the body 8 to provide rotation around a swivel axis. The ring-and-swivel member is detachably attached to a release catch 42 which is in turn detachably attached to the fishing line 3. When tension is applied to the fishing line 3, either by the user or by a fish striking the fish hook, the line 3 will become detached from the release catch 42, releasing the line 3 from the body 8.

Figure 5:
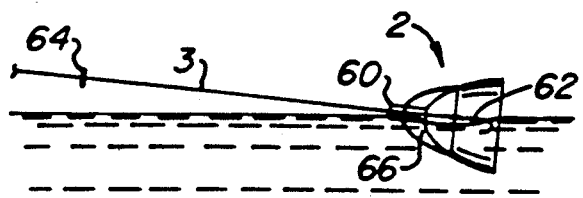
FIG. 5 is a view of a floatable shield constituting a preferred embodiment of the present invention and shown in association with a fishing line and fish hook in motion.
Figure 6:
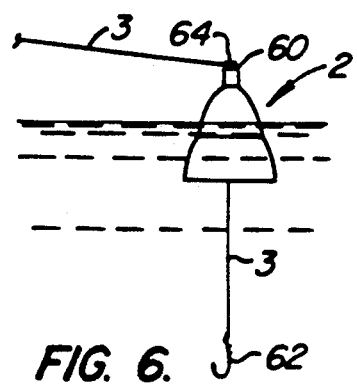
FIG. 6 is a view of the floatable shield of FIG. 5 shown in association with a fishing line and fish hook which are not in motion.
Figure 7A:
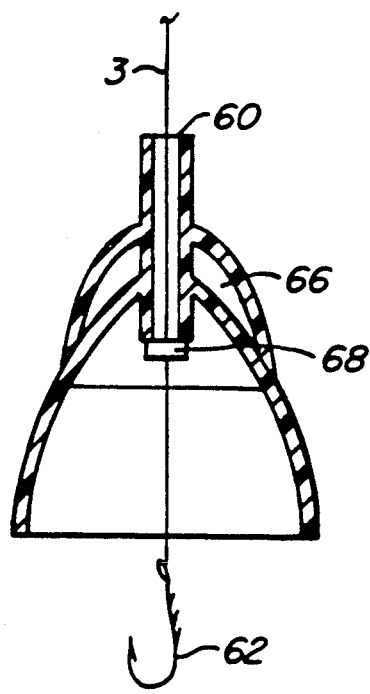
FIG. 7 illustrates various embodiments, in cross-sectional view, of the floatable shield of the invention.
Figure 7B:
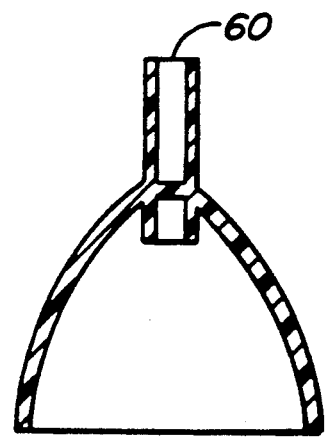
Figure 7C:
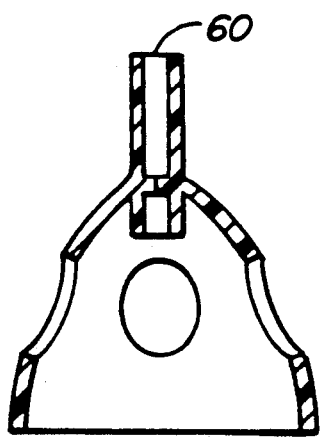
Figure 7D:
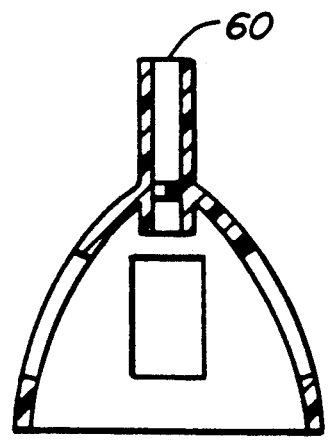

Referring now to FIGS. 5 and 6, illustrated is a floatable shield 2 which is slidably engaged on the fishing line 3 proximate a fish hook 62. When the device 1 and the fishing line 3 are in motion, as shown in FIG. 5, water resistance tends to hold the shield 2 while the line slides freely through the center hole 60 of the shield, pulling fish hook 62 up into the shield, which protects the fish hook from fouling as it is towed. Shield 2 is used to protect a fishing hook on a fishing line when it is being trolled or pulled through the water in areas where trolling is used as a means of fishing, especially in vegetated water areas where the hook would hang up on the vegetation without shield 2. A line stop device 64, which has a diameter larger than the inner diameter of center hole 60 of shield 2, is attached to the fishing line 3 at some point between the shield 2 and the body 8 and at a distance from the fish hook 62 which is equivalent to the depth at which it is desired that the hook descend into the water for purposes of fishing. When the movement of the fishing line 3 is stopped, as shown in FIG. 6, the fish hook 62 drops to a depth predetermined by placement of line stop 64. The weight of the sinking hook, which weight may be provided by bait or tackle or a sinker weight attached to the hook or adjacent to the hook, forces the shield 2 to float up the fishing line to the line stop 64. If trolling with the device of this invention is desired, a line stop device 68 must be placed between the shield 2 and the fish hook 62 at such a position as to allow the fish hook to protrude beyond the shield, as shown in FIG. 7a. In the preferred embodiment, the shield 2 is in the shape of an inverted cone facing the hook end of the fishing line and with an air chamber 66, such as is shown in FIG. 7a. However, for purposes of this invention, the shield can be of any desirable shape (FIGS. 7b-d being examples) and material, with or without holes (FIG. 7c) or slots (FIG. 7d), so long as it meets the requirements of enclosing the fish hook 62 while the device and the fishing line are in motion, of allowing the fish hook to descend while the shield remains afloat when the fishing line is not in motion, and which parts weeds and lets the shield penetrate through without any weeds hanging on the shield.

It is desirable that the exterior surface of the body 8 be relatively smooth and of a shape which allows for easy transit in the water while minimizing the probability of snagging on tree branches, weeds, etc., or the line itself. In the presently preferred embodiment, the body 8 is of a spherical shape which, along with the fact that the impeller is inside the lower portion 12 of the body, makes this fishing device extremely practical for fishing in marshy or weed-filled waters. It is desirable in one embodiment of the invention for the user to be able to open the body of the device so that the batteries 24 may be removed for recharging or replacement. This may be accomplished by having the body comprised of two pieces which separate apart at a pair of mating flanges 50, with an O-ring between the flanges to keep the upper portion 10 water-tight. The mating flanges 50 may be sealed by any convenient means such as, for example, by screws 52, as shown in FIG. 3, or by a plastic snap-lock seal.

The operation of the preferred embodiment in accordance with the present invention will now be described with reference to FIGS. 1-6. The user sets the reel on a fishing pole on free spool. Fishing line 3 is threaded into the inverted shield 2 through its center hole 60 and a fish hook 62 is attached to the end of the fishing line. A sinker or other weight may be attached to the fishing line adjacent to the hook to assist the hook in sinking to the desired fishing depth when the hook reaches a fishing spot. A line stop device 64, such as a piece of rubber band or string for example, is attached to the fishing line 3 between the fishing pole and the shield 2 and at a distance from the hook which is equivalent to the depth at which it is desired that the hook descend into the water for purposes of fishing. To attach the fishing line 3 to the body 8 of the fishing device 1, the fishing line some distance from the fish hook 62 and between the fishing pole and the line stop 64 is placed into a quick-release catch 42 and the catch is attached to the ring-and-swivel member 40 on the body 8. The on/off switch 44 is actuated to supply power to the electrical components of the fishing device. The device is then placed into the water and the transmitter 4 is actuated so as to transmit, radio control signals directing the fishing device to maneuver to a location where the user expects fish to be found. This location can be anywhere within the range of the transmitter 4 and, due to the protection provided to the impeller 18 by the jet port 28 and to the fish hook 62 by the floatable shield 2, can include heavily weeded or otherwise vegetated areas. The hemispherical forward volume in lower portion 12 also affords greater maneuverability and allows more water to be drawn into the fishing device and filtered over a larger surface area, avoiding clogging of impeller 18 in the vegetated areas. It can also include shallow waters and water areas that are not accessible to a boat or to a land-bound user. Once the area to be fished is reached by the device, the user will stop the movement of the body 8, which causes the fish hook 62 to descend while the shield 2 remains floating until the line stop 64 reaches the center hole 60 of the shield, at which point the descent of the fish hook is stopped. The shield 2 remains floating on the surface of the water and can act as a location indicator for the hook. The fishing line 3 may remain attached to the body 8 until such time as a fish strikes the hook, which causes the fishing line 3 to disengage from the release catch 42, thus separating the fishing line from the body 8 of the device. Alternatively, if it is not desired for the fishing line 3 to remain attached to the body 8, the user may apply tension to the fishing line 3, which causes the fishing line to disengage. If a fish does not take the fish hook at this location, the user may maneuver the device, with fishing line and fish hook still attached to the body, to a different location or may have the device return the line and hook back to the shore. As the device and the fishing line begin to move, water resistance tends to hold the shield 2 while the line 3 slides freely through the center hole 60 of the shield, pulling fish hook 62 up into the shield.

The user may utilize the motorized fishing device of this invention to place multiple lines and hooks at different locations by directing the device with line and hook attached to a desired location, disconnecting the line, and returning the device to the user to repeat the operation as many times as desired.

It will be understood that the form of the invention herein described is to be taken as a preferred embodiment only. The present invention should not be limited in its application to the details and construction illustrated in the accompanying drawings or the specification, since numerous modifications and variations will become obvious to those of ordinary skill in the art in view of the applicants' teachings and within the scope of the appended claims.

What is claimed is:

1. An electronic fishing bobber comprising:
   a) a generally spherical body enclosing an upper portion and a lower portion, the upper portion being water-tight and the lower portion having a plurality of sieve-like holes for filtering water entering the lower portion, wherein the lower portion includes a rearward jet port surrounding the impeller so that the impeller is recessed therein and a forward volume for receiving water through the sieve-like holes, wherein the lower portion is generally hemispherical and the forward volume is much larger than the rearward jet port whereby water enters the forward volume through the sieve-like holes before contacting the impeller in the jet port as the body moves forward;
   b) means for moving the body through the water by jet force, the moving means including a motor within the upper portion of the body and an impeller within the lower portion of the body;

c) means for directing movement of the body in the water; and d) means for detachably mounting the body to a fishing line.

2. A fishing device as in claim 1 wherein the motor is battery operated.

3. A fishing device as in claim 2 wherein the battery is rechargeable.

4. A fishing device as in claim 1 wherein the moving means is remote radio-controllable.

5. A fishing device as in claim 1 wherein the directing means is remote radio-controllable.

6. A fishing device as in claim 1 wherein the moving means and the directing means are remote radio-controllable.

7. A fishing device as in claim 1 wherein the directing means includes a rudder.

8. A fishing device as in claim 1 wherein the mounting means comprises a ring-and-swivel member mounted to the body and a release catch detachably attached to the ring-and-swivel member, the release catch being detachably attached to the fishing line.

9. A fishing device as in claim 1 which further comprises a floatable shield slidably engaged to the fishing line between the body and a fish hook, the shield enclosing the fish hook while the fishing line is in motion and floating when the fishing line is not in motion.

10. A fishing device as in claim 9 which further comprises a line stop device attached to the fishing line between the body and the shield and at a distance from the fish hook which is equivalent to a depth at which it is desired that the hook descend into the water for purposes of fishing.

11. An electronic fishing bobber comprising:

a) a generally spherical body enclosing an upper portion and a lower portion, the upper portion being water-tight and the lower portion having a plurality of sieve-like holes for filtering water entering the lower portion, wherein the lower portion includes a rearward jet port surrounding the impeller so that the impeller is recessed therein and a forward volume for receiving water through the sieve-like holes, wherein the lower portion is generally hemispherical and the forward volume is much larger than the rearward jet port whereby water enters the forward volume through the sieve-like holes before contacting the impeller in the jet port as the body moves forward;

b) means for moving the body through the water by jet force, the moving means including a motor within the upper portion of the body and an impeller within the lower portion of the body;

c) means for directing movement of the body in the water; and d) means for detachably mounting the body to a fishing line; and e) a floatable shield slidably engaged to the fishing line between the body and fish hook, the shield enclosing the fish hook while the fishing line is in motion and floating when the fishing line is not in motion.

12. A fishing device as in claim 11 wherein the moving means and the directing means are remote radio-controllable.

13. A fishing device as in claim 11 wherein the motor is battery operated.

14. A fishing device as in claim 11 wherein the directing means includes a rudder.

15. A fishing device as in claim 11 wherein the mounting means comprises a ring-and-swivel member mounted to the body and a release catch detachably attached to the ring-and-swivel member, the release catch being detachably attached to the fishing line.

16. A fishing device as in claim 11 which further comprises a line stop device attached to the fishing line between the body and the shield and at a distance from the fish hook which is equivalent to a depth at which it is desired that the hook descend into the water for purposes of fishing.

17. A floatable shield which is slidably engaged to a fishing line proximate a fish hook, the shield comprising an inverted cone having an air chamber and a passage for the fishing line wherein both the air chamber and passage are located at the apex of the cone, whereby the shield encloses and protects the fish hook while the shield and protected hook are pulled through water containing vegetation without the shield and hook becoming entangled in the vegetation, and acts as a float having said air chamber and passage above the water line when the fish hook is disengaged from the shield for fishing.

* * * * *